United States Patent [19]
Stokes

[11] Patent Number: 5,404,186
[45] Date of Patent: Apr. 4, 1995

[54] TRANSPARENT CALCULATOR FOR OVERHEAD PROJECTION

[76] Inventor: William T. Stokes, 1125 Robin Way, Sunnyvale, Calif. 94087

[21] Appl. No.: 267,558

[22] Filed: Jun. 28, 1994

Related U.S. Application Data

[63] Continuation of Ser. No. 724,200, Jul. 1, 1991, abandoned, which is a continuation of Ser. No. 400,158, Aug. 28, 1989, Pat. No. 5,035,502.

[51] Int. Cl.$^6$ .............................................. G03B 21/00
[52] U.S. Cl. .............................. 353/122; 353/DIG. 3; 434/365
[58] Field of Search ............... 364/708, 705.1; 235/1 D; 350/345; 353/DIG. 3, DIG. 4, DIG. 5, 122, 44; 434/365, 202, 229

[56] References Cited

U.S. PATENT DOCUMENTS

| | | | |
|---|---|---|---|
| 4,154,007 | 5/1979 | Judd | 350/345 X |
| 4,290,708 | 9/1981 | Siwula | 235/1 D X |
| 4,632,529 | 12/1986 | Levin | 355/DIG. 5 X |
| 4,652,101 | 3/1987 | Grunwald | 353/DIG. 5 X |
| 4,810,860 | 3/1989 | Sekine | 235/1 D X |
| 4,836,786 | 6/1989 | Wong | 353/44 X |
| 4,904,079 | 2/1990 | Yoshimura et al. | 353/122 |
| 4,946,274 | 8/1990 | Honda | 353/122 |
| 5,035,502 | 7/1991 | Stokes | 353/122 |
| 5,041,965 | 8/1991 | Chen | 353/122 |

*Primary Examiner*—William A. Cuchlinski, Jr.
*Assistant Examiner*—William C. Dowling
*Attorney, Agent, or Firm*—Thomas M. Freiburger

[57] ABSTRACT

A hand-held calculator has a transparent window carrying a liquid crystal display as well as transparent number and function key locations such that when placed on an overhead projector, the calculator can be used to demonstrate to a classroom of students all operations performed in a sequence of mathematical operations. The plastic casing of the calculator has one or more small holes passing through the casing at corners, so that a string or line can be used to tether the calculator to the overhead projector, preventing damage to the calculator from a fall to the floor. A further feature of the calculator is a protrusion or foot at each corner of the back of the calculator casing, for holding the back surface of the calculator slightly above the light platform of the overhead projector, for cooling of the liquid crystal display by air passing between the light table and calculator.

6 Claims, 4 Drawing Sheets

TRANSPARENT CALCULATOR FOR OVERHEAD PROJECTION

This is a continuation of application Ser. No. 724,200, filed on Jul. 1, 1991, now abandoned, which was a continuation of application Ser. No. 400,158, filed Aug. 28, 1989, now U.S. Pat. No. 5,035,502, issued Jul. 30, 1991.

BACKGROUND OF THE INVENTION

This invention relates to hand-held calculators, and in particular it is concerned with a calculator having transparent background for a liquid crystal display and preferably also for number and function input keys, enabling the calculator to be used with an overhead projector to demonstrate operations of the calculator, along with calculated results, on a screen to a classroom or group.

U.S. Pat. No. 4,154,007 disclosed a hand-held calculator having a transparent window within which a liquid crystal display (LCD) is positioned. This enabled light to be projected through the LCD window and onto a screen or wall to reveal the numbers or symbols as dark elements on the screen with the background left white. The calculator disclosed in the patent was particularly useful with an overhead projector in a classroom, whereby numerical results obtained using the calculator resting on the light platform of the projector could be projected for all in the classroom to view.

Since the above patent was issued, there has been a development by Epson of a pressure-sensitive conductor arrangement useful to produce a clear touch key panel, wherein the pressure of a finger on a key member printed on the back of a transparent membrane will effect sufficient change in conductivity in etched channels of a transparent plate below to act as a pressure switch. The slight change in conductivity is sensed by a circuit which effects a desired result. This technology was dedicated to the public in 1985.

This transparent-key technology has been applied to calculators of the type disclosed in the above referenced patent, with number keys and function are transparent except for the display of a symbol of the number or function. Thus, most of the calculator was transparent and could be projected onto a screen or wall with an overhead projector. In this way, not only numerical results but also the entry of numbers and the pressing of function or operation keys could be demonstrated on the screen using the overhead projector. One such calculator has been marketed by the present applicant, under the trademark "The Educator". A model of that calculator has employed a heavy, opaque grid of lines outlining and delimiting the number and function keys.

Such transparent calculators had certain problems. The transparent key technology required that a glass laminate be used, making the calculator quite fragile if dropped. The calculator could be inadvertently pushed off the glass surface of an overhead projector, for example.

Another problem with these calculators has been heat buildup from the lamp in the overhead projector. Liquid crystal displays are quite susceptible to temperature change, and an increase in temperature will often cause changes in the display and misreadings in the displayed numbers of an LCD calculator of the type described.

A further problem has been in relation to the accuracy of the keys to the applied finger pressure. Due to the nature of the circuitry for implementing these transparent keys, when keys are made smaller and closer together there tends to be some crossover of the effect of pressure on a key, particularly when the pressure is not applied precisely centrally. The result is inaccuracy in the entry of the data or functions to be calculated.

SUMMARY OF THE INVENTION

In accordance with the present invention, a substantially transparent calculator for overhead projection includes new features which overcome the problems described above.

As in previous calculators described above, the hand-held calculator of this invention has a transparent window carrying a liquid crystal display, and also preferably transparent number and function key locations such that when placed on an overhead projector, the calculator can be used to demonstrate to a classroom all operations performed in a sequence of mathematical calculations.

In a preferred embodiment of the present invention, the plastic and glass casing of the calculator has one or more small holes passing through the casing at corners, so that a string or cord (such as a fine nylon fishing line) can be used to tether the calculator to the overhead projector, preventing damage to the calculator from a fall to the floor.

Another feature of the calculator is an improved keyboard of relatively small domain size for each key, with a spacer grid on the back surface of the keyboard overlay element or membrane panel. This spacer grid is effective to provide pressure isolation of an active key from adjacent keys, thereby to prevent mistaken entries, it also prevents extraneous pressures on a preferred black divider grid from being read as key entries by contact with circuit trace paths on the rigid plate below.

A further feature of the calculator is a protrusion or foot at each corner of the back of the calculator casing, for holding the back surface of the calculator slightly above the light platform of the overhead projector. It has been found that this small spacing will enable the liquid crystal display to be cooled by air passing between the light table and calculator, thus avoiding overheating of the LCD display and consequent malfunctioning. In a preferred embodiment the protrusions or feet are rubbery for high-friction engagement with the surface of the projector light table.

Finally, the calculator in one preferred embodiment has a plurality of different transparent background colors for different groups of the transparent function keys, so that in following the operations of the calculator on the screen, the observer can more quickly identify a function by the color group in which the instructor's finger appears in carrying out the calculation. The instructor similarly is aided by the color grouping.

It is therefore among the objects of the invention to overcome problems of previous transparent calculators with features which add to the accuracy and reliability of the calculator, avoid damage to the calculator and provide a more colorful display of the calculator on a screen so as to assist visually a class of observers in following the demonstrated operation and functions carried out. These and other objects, advantages and features of the invention will be apparent from the following description of preferred embodiments considered along with the accompanying drawings.

DESCRIPTION OF PREFERRED EMBODIMENTS

Figure 1:
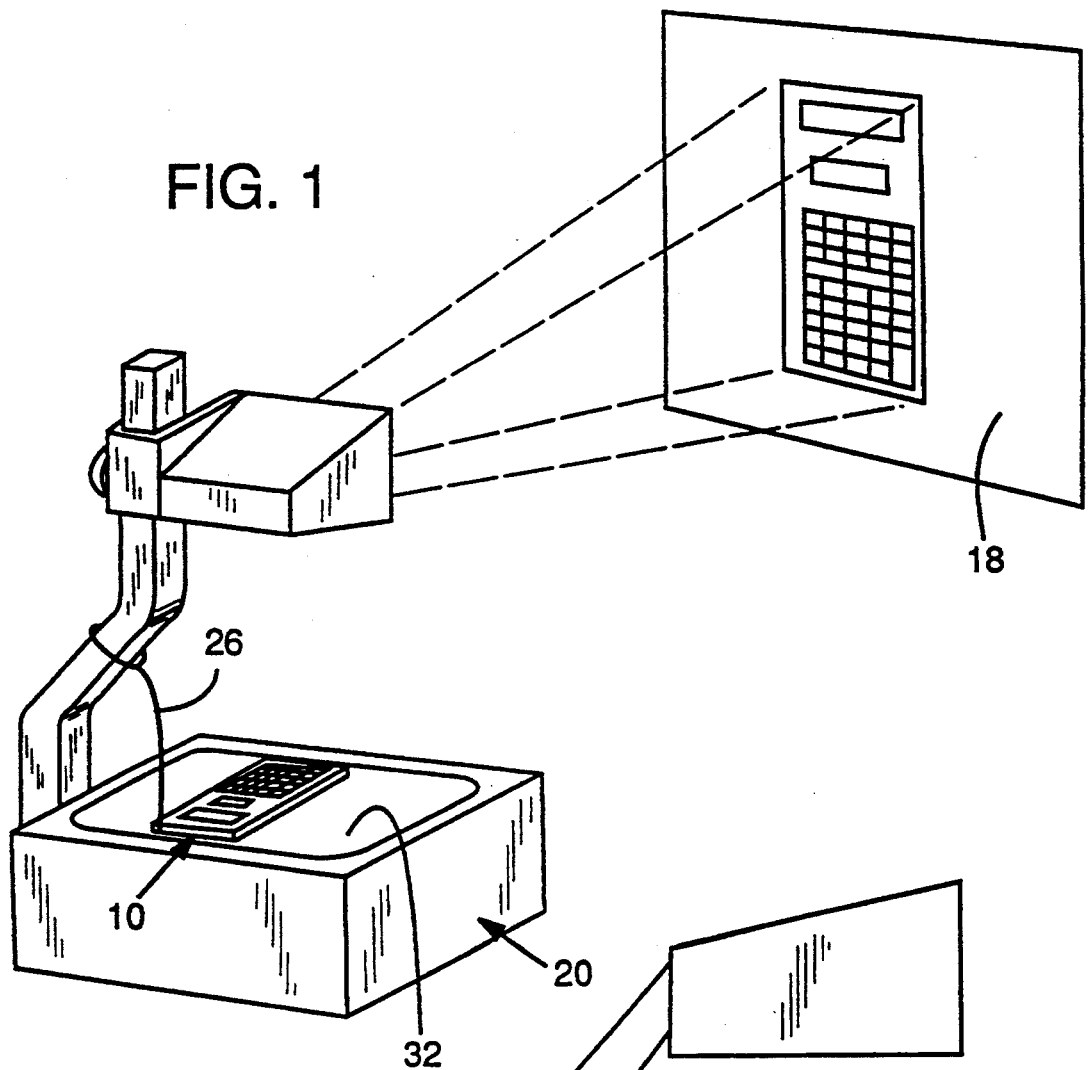
FIG. 1 is a perspective view showing a transparent calculator for overhead projection in accordance with the present invention, as used on an overhead projector.
Figures 2, 3:
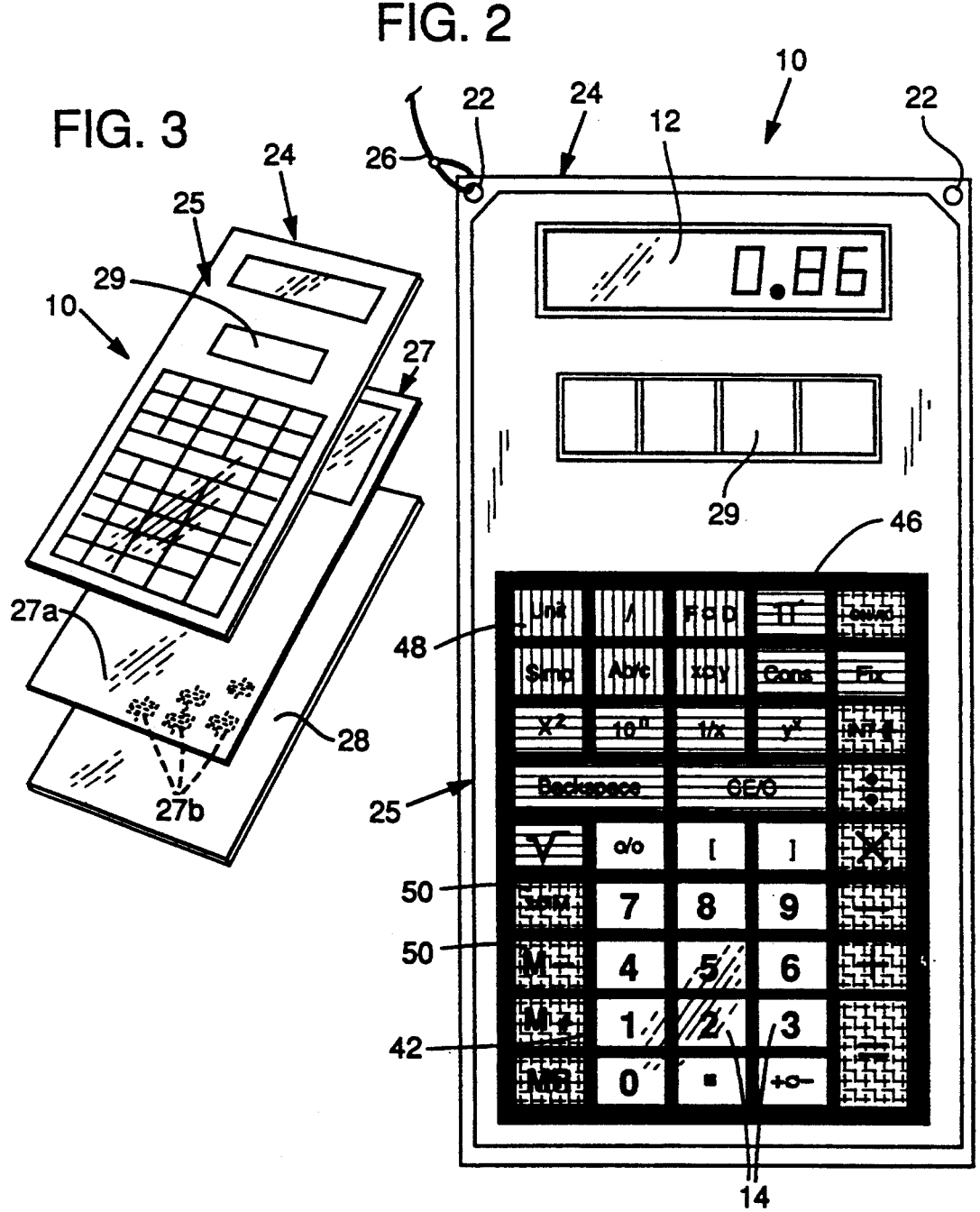
FIG. 2 is a frontal view of the calculator.
FIG. 3 is an exploded schematic perspective view showing elements of a laminated assembly of the calculator of FIG. 1.

In the drawings, FIGS. 1 and 2 show a transparent calculator 10, including a liquid crystal display 12, number keys 14 and function keys 16. FIG. 1 shows the calculator 10 as used for projecting an image of the calculator onto a screen or wall 18 using an overhead projector 20.

The calculator 10 of the invention includes one or more bores 22 through the casing 24 of the calculator, such as at upper end corners as illustrated. These enable a tethering line or cord 26, such as a length of nylon fishing line, to be secured through one of the openings 22 and tied to a part of a table or the overhead projector 20 as illustrated in FIG. 1.

As illustrated schematically in FIG. 3, the basic construction of the calculator 10, as in prior transparent calculators, is a lamination of a flexible front membrane panel 25 with a middle layer 27, at least most of which comprises a rigid (glass) plate 27a, and a backing or base panel 28 preferably of rigid plastic. The plate 27a preferably is of glass because of the etched circuit technology used for the keyboard. Touching of one of the keys on the membrane panel 25 above will contact the etched circuit or circuit trace 27b below with carbon ink on the back of the panel, effecting a change in circuit conductivity which activates the particular number or function key. Glass is more stable with temperature changes and is best used for the plate 27a bearing the circuit traces.

A window 29 receives light for a solar panel below (not shown), and a processor (not shown) is located adjacent to the solar panel.

Figure 6:
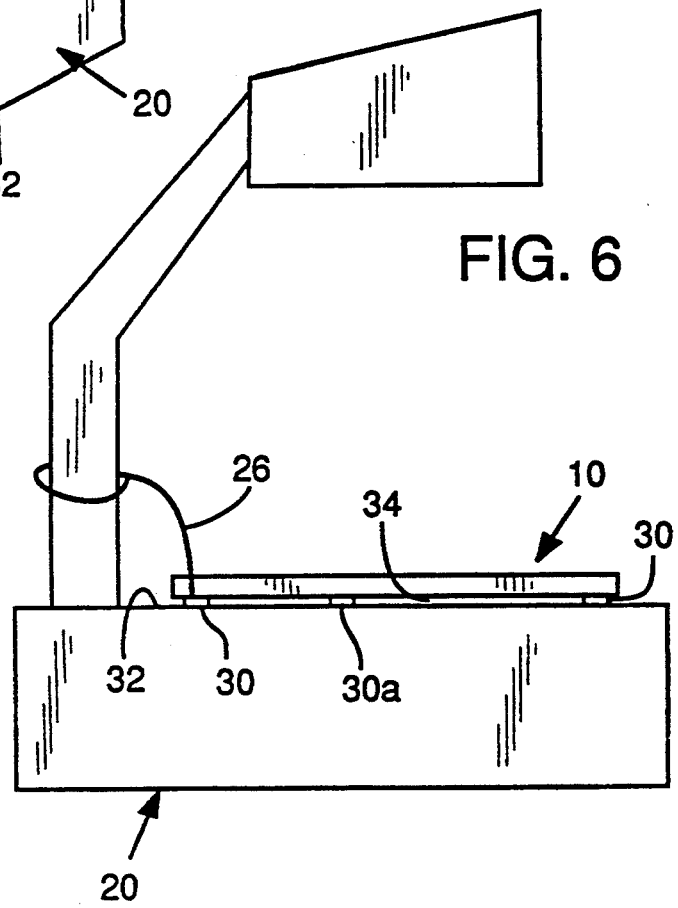
FIG. 6 is side elevation view of the calculator as used on an overhead projector.
Figure 5:
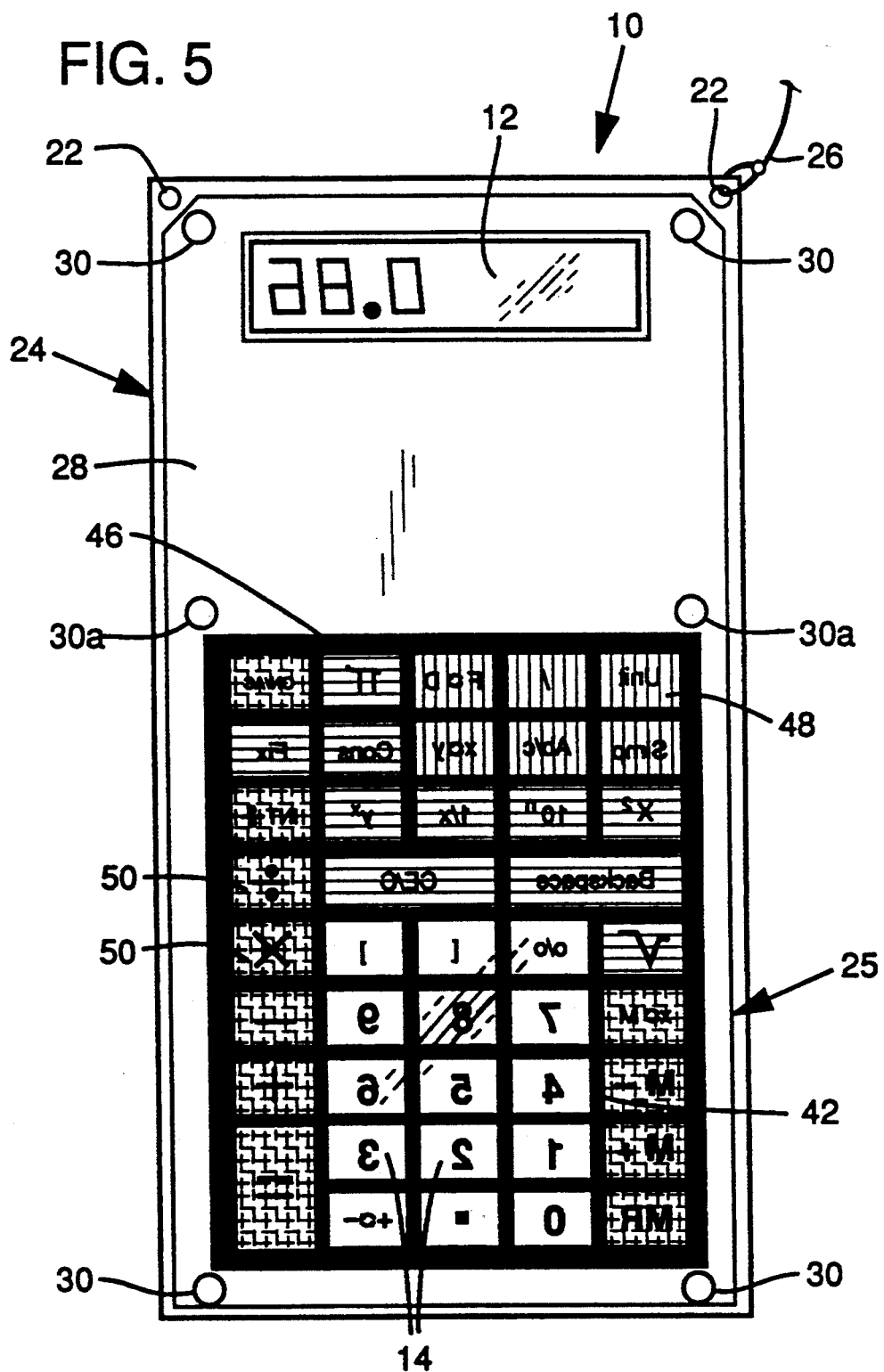
FIG. 5 is a bottom or rear view of the calculator, showing protrusions or feet which extend from the calculator's bottom surface to hold the calculator a slight distance above the surface of a light platform of an overhead projector.

FIGS. 5 and 6 show another feature of the invention. A series of protrusions or "feet" 30, which may include one near each corner of the calculator on the bottom surface of the calculator as illustrated, provide a means for spacing the bottom of the calculator above the light table or platform 32 of the overhead projector 20. An additional pair of feet 30a may be included between the end pairs of feet 30, and these may be behind the top of the keyboard, as shown. As discussed above, this creates an air flow space 34 between the bottom of the calculator and the surface of the light platform. This will ordinarily be sufficient to cool the liquid crystal display 12 of the calculator and to avoid problems of overheating from the lamp of the light platform 32. For example, the feet 30 (and 30a) may have a height or thickness of about 1 to 3 mm protruding below the back surface of the calculator, and this has been found to provide significant cooling. The height of the feet should not be so great, depending on the distance spanned, as to suspend the calculator too high above the platform. Otherwise, heavy pressure on the keys could snap the glass laminate component 27a (FIG. 3) as a mid-span portion of the calculator 13 is deflected downward. The use of six protruding feet 30, 30a helps reduce this concern, as does the limitation of feet height and the use of resilient feet, which enable the back or bottom to contact the light table if heavy pressure is applied.

The feet or protrusions 30 may be formed of a rubbery or elastomeric material which exerts a high-friction grip on the surface of the glass light table 32. This helps prevent slippage of the calculator 10 off the light table and cooperates with the bores 22 and tethering line 26 in preventing dropping and damage to the calculator 10. Resilient, readily compressible feet also cooperate to prevent damage from heavy pressure, as explained above.

Figure 4:
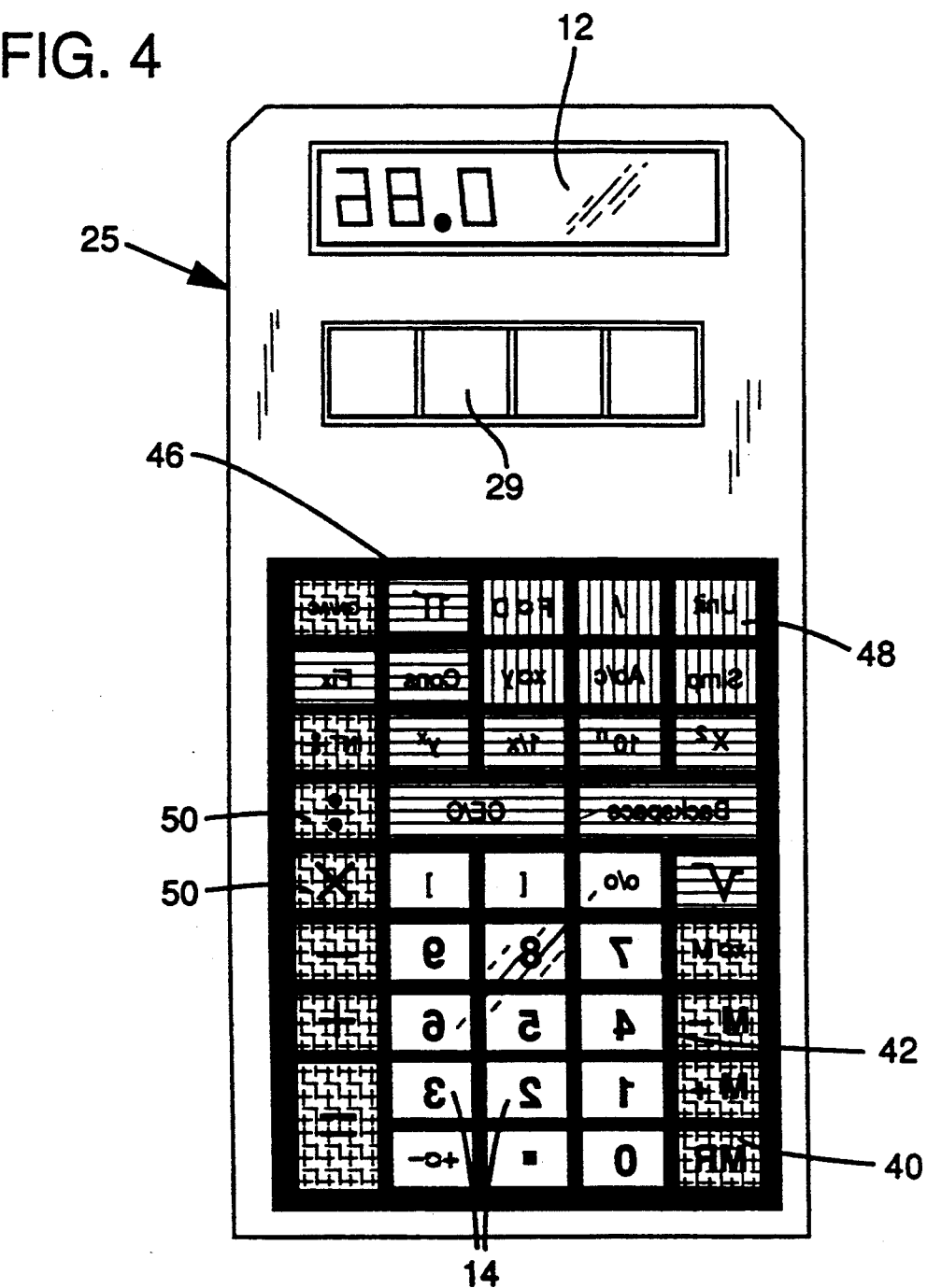
FIG. 4 is a rear plan view of a front membrane panel of the assembly, showing the location of a spacer grid which is secured to the panel, in accordance with one aspect of the present invention.
Figure 4A:
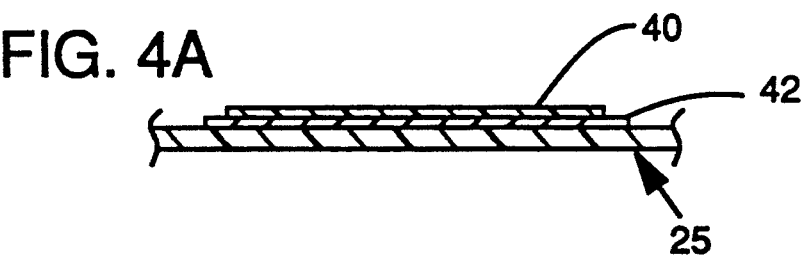
FIG. 4A is a sectional detail view to illustrate a spacer grid on the back side of the front membrane panel.

FIG. 4 illustrates another feature of the invention. To protect against crossover of a pressure signal applied to one of the number keys 14 or function keys 16, which may be of relatively small domain size due to the large number of keys and consequent closeness of the keys in the calculator 10, there is preferably included a grid of spacer material 40 on the back side of an opaque printed grid 42 on the front membrane panel 25. FIG. 4A shows the spacer material 40 on the back of the opaque grid 42. The spacer material may be an epoxy material, preferably applied by silkscreening over the opaque printed grid 42. This grid 40, which may be in the form of a flat strip a millimeter or two in width deposited on the opaque grid 42, is effective to isolate pressure of a finger placed on a number or function key from crossing over to an adjacent key domain as the membrane 25 is pressed against the glass plate 27a, as can happen with closely spaced keys in the absence of the grid of spacer material 40. The spacer material may have a thickness between about 0.001 inch and 0.003 inch, preferably about 0.002 inch.

The heavy opaque grid 42 is an important preferred visual feature of the calculator. With black lines as are preferred, the grid 42 contains carbon. Extraneous pressures on the front of the keyboard could push these carbon-containing lines into contact with paths of the circuit traces leading down to particular keys. On a relatively dense keyboard as shown each key is small and circuit trace paths on the rigid plate 27a run generally along the black grid in leading to particular keys. In some locations six to eight circuit trace paths are ganged together. Such extraneous pressures at the grid could therefore cause erroneous entries, but the isolation grid 40 prevents this by isolating the black lines from the circuit trace paths below.

Another important feature of the invention is shown by the color indications in FIG. 2. Preferably at least two different color backgrounds are used for function keys, for grouping them and permitting a visual identification of certain keys with certain colors. Thus, as seen in FIG. 2, blue may be used for a certain group of keys 46; red may be used for another group of keys 48; and yellow may be used for a third group of keys 50. These colors may be on the back surface of the front membrane panel 25. The transparent colors may be silk-screened onto the respective areas (keys) on the back surface of the panel 25, prior to printing of the function key symbols.

In one preferred embodiment as illustrated, the number keys 714, decimal key, +/−key, % key and bracket keys are transparent and colorless so as to have a white background when projected onto the screen.

Cooperating with the color arrangement for different keys is the heavy, opaque printed grid 42 which outlines the number and function keys 14 and 16. The opaque grid 42, with line widths preferably of about 1/16 to 1/32 inch, preferably is of black, but it should be understood that opaque lines in any color will appear the same on the screen when projected. In any event, the heavy opaque grid 42 distinctly outlines the number and function keys to assist the operator in correctly placing a finger to press on a particular key. This can be important in a calculator having little or no relief on the surface of the keyboard, unlike conventional button type calculators.

Thus, one important feature of the invention is the coordination of use of the calculator of the invention provided by outlining of number and function keys with the heavy opaque grid 42, in cooperation with the key isolation spacing structure described above. The heavy opaque key outline grid 42 also cooperates with the preferred feature of color grouping of the function keys, with transparent projectable colors.

Other features of the invention also cooperate to optimize the convenience and use of the calculator, such as the protrusions or feet 30 in conjunction with the bores or openings 22. If the feet are of high-friction material they will resist sliding of the calculator off the light table (while also providing for cooling); the bores 22 enable a tethering cord to prevent the calculator from dropping to the floor, even if it slips off the table. These features are important whether or not the calculator has a transparent keyboard in addition to the transparent liquid crystal display.

It is therefore clear that the improvements in a transparent, projectable calculator in accordance with the present invention result in improved visibility and visual identification of features on the keyboard, improved integrity of key operation with avoidance of key crossover, better friction gripping of the calculator on a surface, avoidance of overheating of the LCD when used on an overhead projector, prevention of inadvertent and destructive dropping of the calculator when used on the projector, and an overall pleasing and improved appearance of the keyboard including the number keys and the functions keys, especially when projected.

The above described preferred embodiment illustrates the principles of the present invention, but is not intended to limit the scope of the invention. Other embodiments and variations to these preferred embodiments will be apparent to those skilled in the art and may be made without departing from the scope of the invention as defined in the following claims.

I claim:

1. In a transparent projectable calculator having a keyboard and a substantially transparent liquid crystal display for projecting inputs and results of calculations in black against a screen, the improvement comprising,
   spacer means on a bottom surface of the calculator, at separated, spaced apart locations on the bottom surface, for spacing the calculator bottom slightly above a light table of an overhead projector when the calculator is being projected, and for providing sufficient space for air flow between the calculator bottom and the light table, and said spacer means being of such limited height and such separation along the bottom surface of the calculator that pressure applied on the keyboard, sufficient to push the back surface of the calculator into contact with the light table of the overhead projector, will make such contact without damaging the calculator, so that the calculator is protected against breakage due to downward pressure applied between the spacer means,
   whereby air flow is facilitated through the space between the bottom of the calculator and the light table, carrying away heat to the ambient air and cooling the liquid crystal display against overheating by the light table, and without risking breakage of the calculator.

2. The apparatus of claim 1, wherein the spacer means comprise protrusions positioned near each corner of the bottom surface of the calculator.

3. The apparatus of claim 1, wherein the calculator further includes at least one bore through the body of the calculator, near one corner, for receiving a string or cord to secure the calculator to the overhead projector so as to prevent it from dropping to the floor if knocked off the overhead projector.

4. The apparatus of claim 1, wherein the height of the spacer means is in the range of about 1 to 3 millimeters.

5. The apparatus of claim 3, in combination with an overhead projector having a light platform on which the calculator rests, and a string or cord tethered to the calculator through said bore and tethered to the overhead projector.

6. In a transparent projectable calculator having a keyboard and a substantially transparent liquid crystal display for projecting inputs and results of calculations in black against a screen, the improvement comprising,
   spacer means on a bottom surface of the calculator, at separated, spaced apart locations on the bottom surface, for spacing the calculator bottom slightly above a light table of an overhead projector when the calculator is being projected, and for providing sufficient space for air flow between the calculator bottom and the light table, and said spacer means having a height in the range of about 1 mm to 3 mm, so that said space for air flow is about 1 mm to 3 mm in height,
   whereby air flow is facilitated through the space between the bottom of the calculator and the light table, carrying away heat to the ambient air and cooling the liquid crystal display against overheating by the light table.

* * * * *

UNITED STATES PATENT AND TRADEMARK OFFICE
CERTIFICATE OF CORRECTION

PATENT NO. : 5,404,186
DATED : April 4, 1995
INVENTOR(S) : William T. Stokes

It is certified that error appears in the above-indentified patent and that said Letters Patent is hereby corrected as shown below:

TITLE PAGE:

[*] Notice:   The portion of the term of this patent subsequent to July 30, 2008, has been disclaimed.

Signed and Sealed this

Thirteenth Day of June, 1995

*Attest:*

BRUCE LEHMAN

*Attesting Officer*       *Commissioner of Patents and Trademarks*